Nov. 7, 1933.  E. W. STOLER  1,934,102
DIVIDED SPOKE FOR METAL WHEELS
Filed March 8, 1929
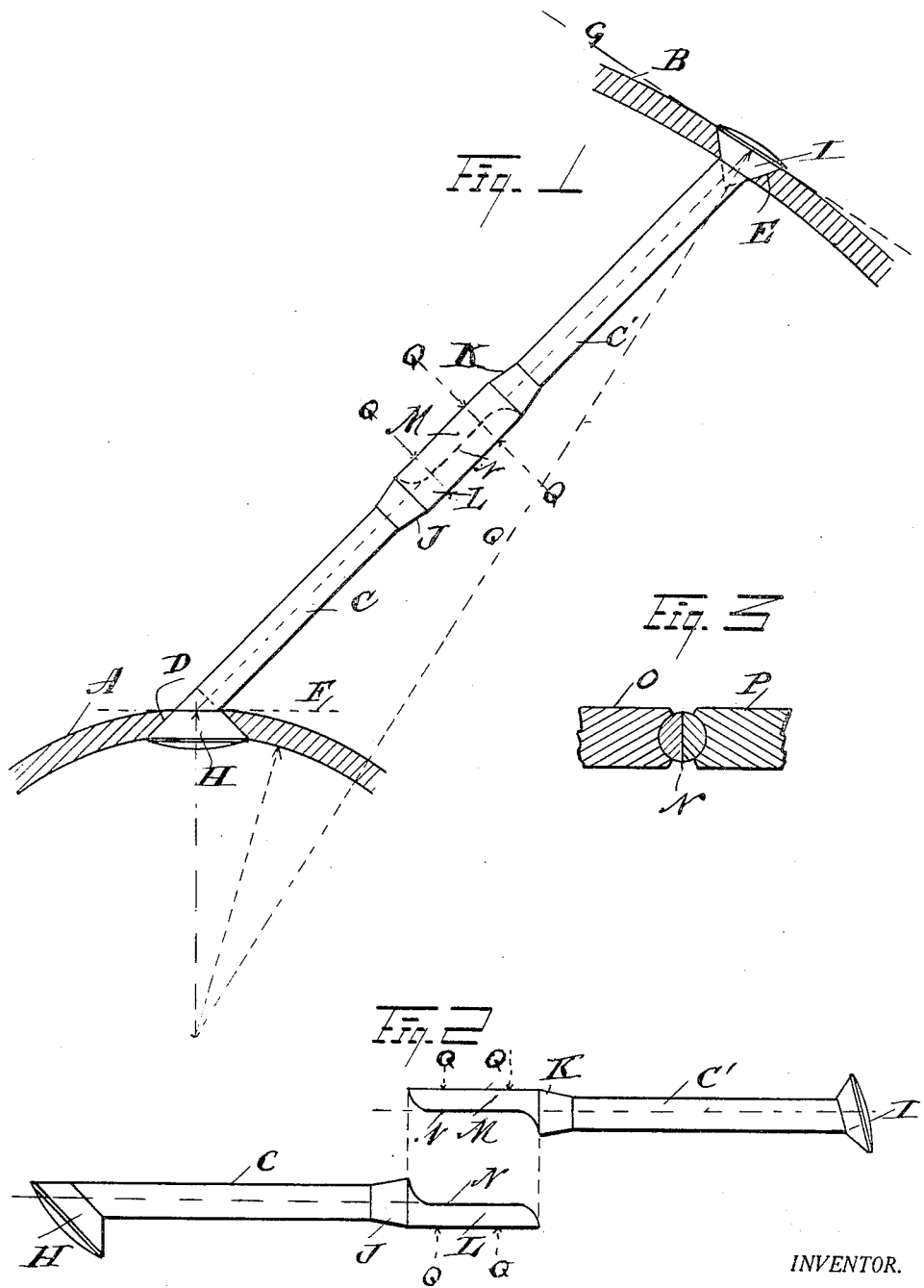
INVENTOR.
Edward W. Stoler
BY
ATTORNEY Patented Nov. 7, 1933

1,934,102

UNITED STATES PATENT OFFICE 1,934,102

DIVIDED SPOKE FOR METAL WHEELS

Edward W. Stoler, Mansfield, Ohio, assignor to Kelsey-Hayes Wheel Corporation, Detroit, Mich., a corporation of New York Application March 8, 1929. Serial No. 345,439

2 Claims. (Cl. 301—104)

The objects of the invention are to provide an improved method of constructing a wire spoke for a metal automobile wheel, in two portions joined together intermediate of its ends, and applying swaged-on heads thereto, thus permitting the spoke portions to be inserted through countersunk openings in the rim and hub and after overlapping their adjacent ends to be rigidly welded together.

In this construction the swaged-on heads described in my previous application bearing Serial Number 270,283, filed April 16, 1928, now Patent Number 1,814,531, patented July 14th, 1931 are employed thus avoiding bending the ends of the spoke or distorting its substance in any injurious way.

Also the heads of the spokes may be set at any desired angle relative to the circumferences of the rim and hub, so that the strain thereon will be direct and will not tend to distort the spoke.

To accomplish these and other useful objects, the device comprises the combination and arrangement of parts and the detail structure, hereinafter more fully described, illustrated in the accompanying drawing and specifically pointed out in the claims.

In the accompanying drawing, Figure 1 is a transverse section of portions of the hub and rim, showing one of the spokes with assembled parts in place and welded together.

Figure 2 is a side elevation showing the parts of the spoke headed and formed for welding together; Figure 3 is a transverse section of welding dies.

In these views, A represents the metal hub; B represents the metal rim, and C, C' represent the metal portions of the spoke.

The hub and rim are provided with countersunk openings D and E respectively, and the spoke which may have its major axis inclined at an angle of 45 deg. to the tangent of the hub and at a slighter angle to the tangent G of the rim, is provided with heads H and I, respectively that are swaged thereon at corresponding angles to the major axis of the spoke, thus causing no lateral or twisting strains upon the spoke by bending the spoke.

The opposed extremities of the spoke portions are slightly enlarged at J, K, adjacent to the overlapping portions L, M, to laterally offset the same, and their approximated sides are welded together upon a plane N in the longitudinal axis of the spoke, thus materially strengthening the spoke at this point, and leaving the extremities of less diameter and therefore producing a spoke that is structurally strong and at the same time will yield to vibrations without breaking at the points of juncture with the rim and hub.

The overlapping parts may be spot welded at as many points Q as may be required, two points of welding being preferred.

In Figure 3 suitable dies O, P, for spot welding are shown.

Having described the invention what I claim as new and desire to secure by Letters Patent is:

1. A spoke of the character described including two sections, each provided with a body portion, a head at one end of the body portion and an enlarged portion at the opposite end of the body portion of greater diameter than the body portion, said enlarged portion being laterally offset for the reception and overlapping of complemental portions of the companion section, said overlapping portions being permanently united by a weld.

2. A spoke of the character described including two sections, each provided with a body portion, a head at one end of the body portion and an enlarged portion at the opposite end of the body portion of greater diameter than the body portion, said enlarged portion being laterally offset for the reception and overlapping of complemental portions of the companion section and provided with a transverse abutment to determine the length of the spoke, said overlapping portions being permanently united by a weld.

EDWARD W. STOLER.